United States Patent [19]
Schneider, Jr.

[11] Patent Number: 5,532,976
[45] Date of Patent: Jul. 2, 1996

[54] CURVED-RAY REPLACEMENT DYNAMICS

[75] Inventor: William A. Schneider, Jr., Houston, Tex.

[73] Assignee: Exxon Production Research Company, Houston, Tex.

[21] Appl. No.: 277,543

[22] Filed: Jul. 19, 1994

[51] Int. Cl.$^6$ .................................................. G01V 1/28
[52] U.S. Cl. .............................. 367/38; 364/421; 367/54
[58] Field of Search ................................. 367/38, 54, 36; 364/421

[56] References Cited

U.S. PATENT DOCUMENTS

| | | | |
|---|---|---|---|
| 4,101,867 | 7/1978 | Martin | 340/15.5 TC |
| 4,695,984 | 9/1987 | Paal | 367/54 |
| 4,887,244 | 12/1989 | Willis et al. | 364/421 |
| 4,918,670 | 4/1990 | Wang | 367/38 |
| 4,943,918 | 7/1990 | Young | 364/421 |
| 4,992,993 | 2/1991 | Chambers | 364/421 |
| 5,103,429 | 4/1992 | Gelchinsky | 367/38 |
| 5,136,550 | 8/1992 | Chambers | 367/38 |
| 5,136,553 | 8/1992 | Kelly et al. | 367/52 |

OTHER PUBLICATIONS

"Submarine canyons: Velocity replacement by wave-equation datuming before stack"; John R. Berryhill; Geophysics, vol. 51, No. 8 (Aug. 1986); pp. 1573–1579.

"Efficient migration through complex water-bottom topography"; Walt Lynn, Scott MacKay, Craig, J. Beasley: Geophysics, vol. 58, No. 3, (Mar. 1993); pp. 393–398.

"Improving Velocity Analysis beneath a Submarine Canyon using Velocity Redatuming"; Peter Stickland, Greg Beresford, Dylan Mair; Exploration Geophysics (1991), vol. 22, pp. 583–590.

"Prestack layer replacement"; Oz Yilmaz, Darran Lucas; Geophysics vol. 51, No. 7 (Jul. 1986); pp. 1355–1369.

"3-D Reflection Synthetic Seismograms"; Miles J. Kuhn; 13th Annual Offshore Technology Conference, 1981 Proceeding, vol. III, 4065–4115.

"Offset Dependent Static Corrections on a Continental Shelf Edge 3D Seismic Survey"; M. G. Cousins, P. M. Whiting, T. J. Allen; Exploration Geophysics (1991), vol. 22, pp. 75–80.

Schneider, Jr., William A.; Phillip, Lindy D.; and Paal, Ernest F., "Wave-equation velocity replacement of the low-velocity layer for overthrust-belt data", *Geophysics*, 60, pp. 573–579. Mar. 1995.

Primary Examiner—Michael J. Carone
Assistant Examiner—Theresa M. Wesson
Attorney, Agent, or Firm—S. A. McLean; Keith A. Bell

[57] ABSTRACT

A method of geophysical prospecting wherein nonhyperbolic distortion is reduced from marine seismic data, or land seismic data over a low seismic velocity layer, is disclosed. The method comprises replacing the seismic velocity of the water or low seismic velocity layer with sediment seismic velocity and using analytic ray tracing to determine a mapping function to correct recorded seismic data for removal of the distortion, which occurs because of the high seismic velocity contrast at the water or low seismic velocity layer.

16 Claims, 4 Drawing Sheets

CURVED-RAY REPLACEMENT DYNAMICS

FIELD OF THE INVENTION

This invention relates to the field of geophysical exploration. More particularly, it relates to processing of seismic signals to reduce nonhyperbolic distortion caused by high seismic velocity contrast between two adjacent layers with an irregular boundary.

BACKGROUND OF THE INVENTION

The search for subsurface hydrocarbon deposits typically involves a multifaceted sequence of data acquisition, analysis, and interpretation procedures. The data acquisition phase involves use of an energy source to generate signals which propagate into the earth and reflect from various subsurface geologic structures. The reflected signals are recorded by a multitude of receivers on or near the surface of the earth, or in an overlying body of water. The received signals, which are often referred to as seismic traces, consist of amplitudes of elastic waves which vary as a function of time, receiver position, and source position. The data analyst uses these traces along with a geophysical model to develop an image of the geologic structure.

The analysis phase involves procedures which vary depending on the nature of the geological structure being investigated, and on the characteristics of the data set itself. In general, however, the purpose of a typical seismic data processing effort is to produce an image of the geologic structure from the recorded data. That image is developed using theoretical and empirical models of the manner in which the signals are transmitted into the earth, attenuated by the subsurface strata, and reflected from the geologic structures. The quality of the final product of the data processing sequence is heavily dependent on the accuracy of these analysis procedures.

The final phase is the interpretation of the processed results. Specifically, the interpreter's task is to assess the extent to which subsurface hydrocarbon deposits are present, thereby aiding such decisions as whether additional exploratory drilling is warranted or what an optimum hydrocarbon recovery scenario may be. In that assessment, the interpretation of the image involves a variety of different efforts. For example, the interpreter often studies the imaged results to obtain an understanding of the regional subsurface geology. This may involve marking main structural features, such as faults, synclines and anticlines. Thereafter, a preliminary contouring of horizons may be performed. A subsequent step of continuously tracking horizons across the various vertical sections, with correlations of the interpreted faults, may also occur. As is clearly understood in the art, the quality and accuracy of the results of the data analysis step of the seismic sequence has a significant impact on the accuracy and usefulness of the results of this interpretation phase.

Marine seismic data are occasionally recorded in regions characterized by moderate to highly irregular water-bottom surfaces or bathymetry. The Gippsland Basin offshore of Australia is an example. The seismic velocity contrast at the sea floor, in these regions, exhibits significant lateral variations which cause nonhyperbolic moveout in recorded seismic data. This can be more easily appreciated by realizing that the seismic velocity of water is roughly 1500 m/sec while that of sediment is on the order of 2200 m/sec. An irregular water bottom will, therefore, produce lateral seismic velocity changes on the order of 50% where the interface steeply dips. Commonly performed time-processing steps such as: normal move out (NMO), dip move out (DMO), stack and poststack migration; or prestack time migration; perform suboptimally when subjected to data contaminated with these distortions. This is because these processes assume reflection events always have hyperbolic form—an assumption which, due to the nonhyperbolic moveout, frequently is inaccurate. Therefore, the processing technician must either reduce the distortions prior to applying time-processing steps, or use relatively expensive prestack depth migration technology.

If the primary source of nonhyperbolic moveout in the data is sea floor related, then prestack depth migration would not be cost effective due to the large degree of irregularity introduced by the floor. This is exacerbated with three dimensional (3D) data, which is inherently much more expensive to manipulate than is two dimensional data, due to the added dimension. The most cost-effective approach in general is to reduce the nonhyperbolic distortion prior to the time-processing steps. However, for 3D seismic data, few satisfactory methods exist. Wave equation datuming is the theoretically preferred method; however, it is inapplicable to conventionally recorded 3D seismic. See, for example, Berryhill, "Submarine Canyons: Velocity Replacement by Wave-Equation Datuming Before Stack," *Geophysics*, Vol. 51, No. 8 (August 1986), pp. 1572–1579. Even if it were applicable, it would be prohibitively expensive. Static, corrections, another method known to those experienced in the art, see Sheriff, *Encyclopedic Dictionary of Exploration Geophysics* (3d ed. 1991) at p. 282, are adequate only if irregularity of the water bottom is small. Numerical ray tracing procedures, known as general replacement dynamics, are extremely expensive but precise. Sheriff, supra, at p. 242. Sometimes these procedures are used in a target-oriented way to make them affordable, but this compromises overall imaging. Another method has been proposed in Lynn, MacKay, and Beasley, "Efficient Migration Through Complex Water-Bottom Topography," *Geophysics*, Vol. 58, No. 3 (March 1993), pp. 393–398. The Lynn et al. method proposes substituting zero for the seismic velocity of, first, the sediment below the water bottom and, then, the water. However, it is not significantly more accurate than static correction.

Analogous difficulties arise in processing of land seismic data where there is a low seismic velocity layer (LVL) near the surface: again, there is a high seismic velocity contrast between the LVL and the formations below it. See copending U.S. patent application Ser. No. 08/134,808, now S.I.R. H001529 filed Oct. 12, 1993, which discloses a 2D solution for reducing distortions caused by the LVL.

There is therefore a need for a method to correct distortions in marine seismic data, or land seismic data over a LVL, particularly 3D marine or land seismic data, to reduce distortions caused by the seismic velocity contrast at the sea floor or the bottom of the LVL, which method is efficient and yields high quality images.

SUMMARY OF THE INVENTION

Nonhyperbolic distortion of seismic data occurs where the seismic velocity contrast between two adjacent layers with an irregular boundary is high. Generally, the larger the contrast, and the more irregular the boundary, the larger the distortion. An analytic ray tracing method is proposed to reduce such nonhyperbolic distortion from seismic data, where the data are collected using at least one source and a plurality of receivers. This method is referred to throughout this disclosure as the "replacement dynamics" method. In applying this method, the reflector is assumed to be essentially planar at and near the point of reflection; hence, throughout this disclosure, there will be reference to the reflecting "plane." It should be noted that this reflector is most likely less planar as one includes more area around the point of reflection; however, little is known about the subsurface at the time of constructing the model herein, and thus the assumption of the reflector's being planar at the point of reflection is simple and sufficient.

Disclosed is a computer-implemented method for processing a seismic data trace, which trace records seismic energy received by a receiver in response to a signal from a source, to reduce nonhyperbolic distortion caused by high seismic velocity contrast between adjacent upper and lower layers of the earth, which layers have an irregular boundary, the shape of which boundary can be described by a mathematical function, and each of which layers has a corresponding seismic velocity, said method comprising the steps of: (a) determining source and receiver positions for a signal on said seismic data trace; (b) determining the seismic velocity in said upper layer and a subsurface velocity function for said lower layer; (c) determining, according to Fermat's principle and Snell's law, a raypath from said source downwardly through said irregular boundary to a reflector located within said lower layer and then upwardly through said irregular boundary to said receiver; (d) determining the seismic traveltime along said raypath from said source to said receiver using said seismic velocity in said upper layer for portions of said raypath in said upper layer and said subsurface seismic velocity function for portions of said raypath in said lower layer; (e) determining a replacement seismic velocity for said upper layer, which replacement seismic velocity reduces said seismic velocity contrast between said upper and lower layers; (f) repeating step (d) using said replacement seismic velocity in lieu of said seismic velocity in said upper layer; (g) determining the traveltime difference between the traveltime obtained in step (d) and the traveltime obtained in step (f); and (h) shifting the location of said signal on said seismic trace by an amount equal to said traveltime difference to reduce the nonhyperbolic distortion associated with said signal.

Said replacement seismic velocity is preferably the value of the seismic velocity of the sediment near but below the water bottom, as described in further detail herein.

It is an object of this invention to provide an efficient, inexpensive and accurate method of deducing nonhyperbolic distortion in seismic data, where such distortion arises from high seismic velocity contrast between two adjacent layers with an irregular boundary.

This and other objects and features of the invention will be apparent to one of ordinary skill in the art upon examination of the specification, figures and claims herein.

BRIEF DESCRIPTION OF THE DRAWINGS

The present invention and its advantages will be better understood by referring to the following detailed description and the attached drawings in which.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DESCRIPTION OF THE PREFERRED EMBODIMENTS

For purposes of illustrating the invention, it will be assumed that the data in question is marine seismic data. However, this should not be considered as limiting the scope of the invention. Persons skilled in the art will readily understand that the invention is equally applicable to land seismic data, as occasionally referenced throughout the disclosure.

Further, in the preferred embodiment, the replacement dynamics method is performed on a computer.

Figure 1:
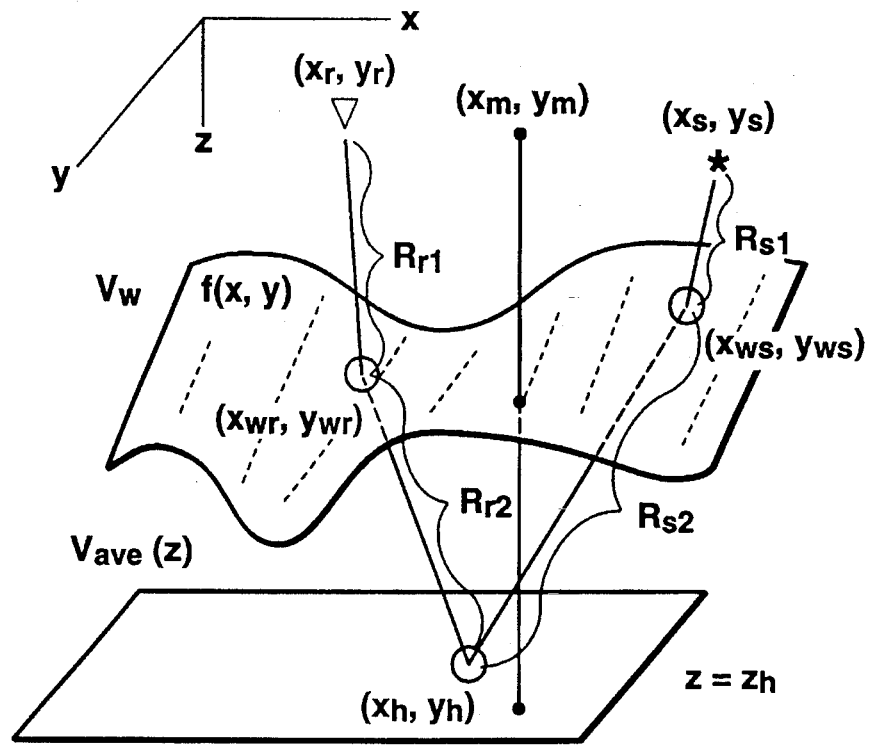
FIG. 1 illustrates the geometry involved in the calculations.

To facilitate understanding, the following terms are defined and illustrated in FIG. 1:

$f(x, y)$—function defining the location of the water bottom, corresponding to x and y as measured at the surface;

$R_{r1}$—the length of the ray from the receiver position to the water bottom;

$R_{r2}$—the length of the ray segment connecting the end of $R_{r1}$ at water bottom surface to reflecting depth $z_h$, which obeys Snell's law at the water bottom surface and at the reflecting plane;

$R_{s1}$—the length of the ray from the source position to the water bottom;

$R_{s2}$—the length of the ray segment connecting the end of $R_{s1}$ at water bottom surface to reflecting depth $z_h$, which obeys Snell's law at the water bottom surface and at the reflecting plane;

t—traveltime from source to receiver;

$V_{ave}(Z_h)$—a seismic velocity function indicating the average seismic velocity for the subsurface above $z_h$;

$V_r$—the replacement seismic velocity function, which should generally be approximately that of sediment velocity, and in the preferred embodiment is $V_{ave}(Z_h)$ where $z_h$ is essentially at or just below the water bottom, since such selection should minimize the seismic velocity contrast;

$V_w$—the seismic velocity of seismic waves in the top layer, which in marine cases corresponds to water velocity;

$x_h, y_h, z_h$—the three dimensional rectangular coordinates of the reflection point on the subsurface reflecting plane;

$x_m, y_m$—the x, y coordinates of the midpoint of the line defined by the locations of the source and the receiver;

$x_r, y_r$—the coordinates on the water surface (z=0) of the receiver; note that source and receiver are usually at or near the water surface, and that the discussion herein assumes this—if they are not at or near the surface, the equations can be modified accordingly by a person skilled in the art;

$x_s, y_s$—the coordinates on the water surface (z=0) of the source;

$x_{ws}, y_{ws}$—the coordinates on the water bottom of the end point of $R_{s1}$; and $x_{wr}, y_{wr}$—the coordinates on the water bottom of the end point of $R_{r1}$.

FIG. 1 depicts the geometry with one seismic trace from a 3D survey and a modeled raypath that refracts, according to Snell's law as is known to one of ordinary skill in the art, at the water-bottom surface, f(x, y), and reflects from a planar reflector at depth $z_h$. The seismic velocity in the water layer, $V_w$, is assumed constant, and in the preferred embodiment a one dimensional interval seismic velocity profile function, $V_{ave}(Z_h)$, is assumed for the underlying sediments. This seismic velocity function may be assumed to extend vertically below the water-bottom surface, f(x,y), giving seismic velocity contour lines that parallel the water bottom, or it may be made to vary vertically with depth, independently from the water bottom surface, or it may be expressed in other ways which would make sense given the particular formation under consideration, as would be recognized by those of ordinary skill in the art. In another embodiment, it may be appropriate to allow the seismic velocity in the sediment to vary laterally. For the reflection from depth $z_h$, a constant seismic velocity equaling the average seismic velocity between the water bottom and depth $z_h$ is used. This constant seismic velocity is termed $V_{ave}(Z_h)$, and is preferably computed by averaging slowness, which is the inverse of seismic velocity, rather than averaging velocities. This is done to increase accuracy and preserve vertical traveltime through the model. Averaging velocities will not result in such a preservation, since seismic velocity adds in parallel and slowness adds in series.

As is shown in FIG. 1, the rays beneath the water bottom, reflecting off the plane, are straight. However, since $V_{ave}(Z_h)$ varies as a function of $z_h$, these rays are effectively curved. This is known as a Dix-type approximation, and it is accurate for rays traveling in directions up about 40 degrees away from the direction of the seismic velocity gradient (nominally the vertical). With these definitions and FIG. 1, the equation for the modeled ray path that reflects from a plane at depth $z_h$ is written as:

$$t=(R_{s1}+R_{r1})/V_w+(R_{s2}+R_{r2})/V_{ave}(Z_h), \quad (1)$$

wherein the four ray path sublengths are $$R_{s1}=\{(x_{ws}-x_s)^2+(y_{ws}-y_s)^2+f^2(x_{ws}, y_{ws})\}^{1/2} \quad (2)$$

$$R_{s2}=\{(x_h-x_{ws})^2+(y_h-y_{ws})^2+[z_h-f(x_{ws}, y_{ws})]^2\}^{1/2} \quad (3)$$

$$R_{r1}=\{(x_{wr}-x_r)^2+(y_{wr}-y_r)^2+f^2(x_{wr},y_{wr})\}^{1/2} \quad (4)$$

$$R_{r2}=\{(x_h-x_{wr})^2+(y_h-y_{wr})^2+[z_h-f(x_{wr}, y_{wr})]^2\}^{1/2} \quad (5)$$

as obtained by application of the Pythagorean theorem.

By substituting Equations (2) through (5) into Equation (1), it is seen that the equation for traveltime, t, has six unknowns: $x_{ws}, y_{ws}, x_{wr}, y_{wr}, x_h$ and $y_h$.

A true raypath satisfies Fermat's principle, which principle says that such a raypath is stationary. This means that traveltime on that raypath satisfies the following:

$$\partial t/\partial x_{ws}=0 \quad (6)$$

$$\partial t/\partial y_{ws}=0 \quad (7)$$

$$\partial t/\partial x_{wr}=0 \quad (8)$$

$$\partial t/\partial y_{wr}=0 \quad (9)$$

$$\partial t/\partial x_h=0 \quad (10)$$

$$\partial t/\partial y_h=0 \quad (11)$$

By differentiating the traveltime equation (1) with respect to each of the six unknowns, and setting each result equal to zero as required by Equations (6) through (11), the Fermat equations, one obtains the following six nonlinear equations in the six unknowns which may be solved numerically for the six coordinates specifying a Fermat's principle reflection ray path. Such a ray path will satisfy Snell's law at the water-bottom refraction points and at the planar reflection point.

$$\left[(x_{ws}-x_s)+f(x_{ws},y_{ws})\frac{\partial f}{\partial x_{ws}}\right]- \quad (12)$$
$$\left[(x_h-x_{ws})+[z_h-f(x_{ws},y_{ws})]\frac{\partial f}{\partial x_{ws}}\right]\frac{R_{s1}V_w}{R_{s2}V_{ave}(z_h)}=0$$

$$\left[(y_{ws}-y_s)+f(x_{ws},y_{ws})\frac{\partial f}{\partial y_{ws}}\right]- \quad (13)$$
$$\left[(y_h-y_{ws})+[z_h-f(x_{ws},y_{ws})]\frac{\partial f}{\partial y_{ws}}\right]\frac{R_{s1}V_w}{R_{s2}V_{ave}(z_h)}=0$$

$$\left[(x_{wr}-x_r)+f(x_{wr},y_{wr})\frac{\partial f}{\partial x_{wr}}\right]- \quad (14)$$
$$\left[(x_h-x_{wr})+[z_h-f(x_{wr},y_{wr})]\frac{\partial f}{\partial x_{wr}}\right]\frac{R_{r1}V_w}{R_{r2}V_{ave}(z_h)}=0$$

$$\left[(y_{wr}-y_r)+f(x_{wr},y_{wr})\frac{\partial f}{\partial y_{wr}}\right]- \quad (15)$$
$$\left[(y_h-y_{wr})+[z_h-f(x_{wr},y_{wr})]\frac{\partial f}{\partial y_{wr}}\right]\frac{R_{r1}V_w}{R_{r2}V_{ave}(z_h)}=0$$

$$\frac{x_h-x_{ws}}{R_{s2}}+\frac{x_h-x_{wr}}{R_{r2}}=0 \quad (16)$$

$$\frac{y_h-y_{ws}}{R_{s2}}+\frac{y_h-y_{wr}}{R_{r2}}=0 \quad (17)$$

There are many numerical techniques, any of which could be used, to solve these six nonlinear equations for the six unknowns, Newton's method in multidimensions would be a standard approach, and one known to one of ordinary skill in the art. However, Newton's method is not computationally efficient because it requires iteratively inverting a six-by-six matrix for each reflector. The preferred embodiment is simpler and more efficient, depending on the data set. This preferred embodiment is the method of fixed-point iteration described herein.

To understand fixed-point iteration, consider the nonlinear equation in one unknown variable, A(x)=0. If it is possible to rearrange the terms in A(x)=0 and rewrite the equation in the form, x=B(x), termed a "fixed-point equation," as is known to those of ordinary skill in the art of mathematics, then one may attempt an efficient iterative solution by assuming an initial guess, $x_0$, then recursively solving $x_k=B(x_{k-1})$ for k=1,2,3, . . . until the iterates are not changing much ($|x_m-x_{m-1}|$ is small); one of ordinary skill in the art can determine an acceptable degree of change, but the change would generally be less than 5%. In one variable, if $|dB(x)/dx|<1$ for x within some domain, then convergence is guaranteed for any $x_0$ chosen within that domain. This principle extends to multidimensions. Equations 12 through 17 can be rewritten in a fixed point form and implemented in a way that usually leads to convergence in only a few (generally 2 to 4) iterations, in an efficient manner.

Equations 12 through 17 are first rewritten to solve for the six unknowns, thus:

$$x_{ws} = \frac{x_s - f(x_{ws},y_{ws})\frac{\partial f}{\partial x_{ws}} + \frac{R_{s1}V_w}{R_{s2}V_{ave}(z_h)}\left(x_h + [z_h - f(x_{ws},y_{ws})]\frac{\partial f}{\partial x_{ws}}\right)}{1 + \frac{R_{s1}V_w}{R_{s2}V_{ave}(z_h)}} \quad (18)$$

$$y_{ws} = \frac{y_s - f(x_{ws},y_{ws})\frac{\partial f}{\partial y_{ws}} + \frac{R_{s1}V_w}{R_{s2}V_{ave}(z_h)}\left(y_h + [z_h - f(x_{ws},y_{ws})]\frac{\partial f}{\partial y_{ws}}\right)}{1 + \frac{R_{s1}V_w}{R_{s2}V_{ave}(z_h)}} \quad (19)$$

$$x_{wr} = \frac{x_r - f(x_{wr},y_{wr})\frac{\partial f}{\partial x_{wr}} + \frac{R_{r1}V_w}{R_{r2}V_{ave}(z_h)}\left(x_h + [z_h - f(x_{wr},y_{wr})]\frac{\partial f}{\partial x_{wr}}\right)}{1 + \frac{R_{r1}V_w}{R_{r2}V_{ave}(z_h)}} \quad (20)$$

$$y_{wr} = \frac{y_r - f(x_{wr},y_{wr})\frac{\partial f}{\partial y_{wr}} + \frac{R_{r1}V_w}{R_{r2}V_{ave}(z_h)}\left(y_h + [z_h - f(x_{wr},y_{wr})]\frac{\partial f}{\partial y_{wr}}\right)}{1 + \frac{R_{r1}V_w}{R_{r2}V_{ave}(z_h)}} \quad (21)$$

$$x_h = \frac{x_{ws} + \frac{R_{s2}}{R_{r2}}x_{wr}}{1 + \frac{R_{s2}}{R_{r2}}} \quad (22)$$

$$y_h = \frac{y_{ws} + \frac{R_{s2}}{R_{r2}}y_{wr}}{1 + \frac{R_{s2}}{R_{r2}}} \quad (23)$$

Figure 2:
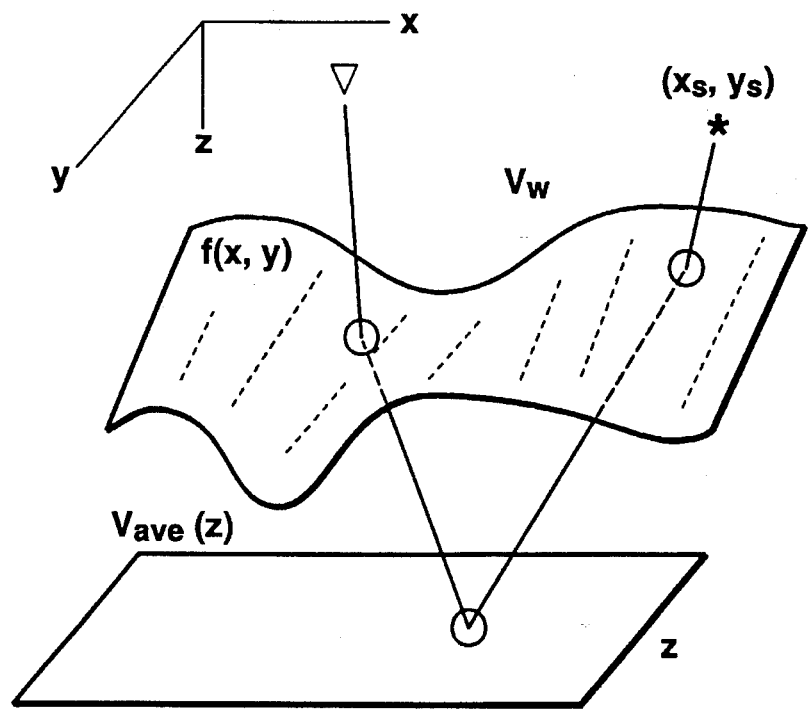
FIG. 2 focuses on the step of calculation using the seismic velocity of water.
Figure 3:
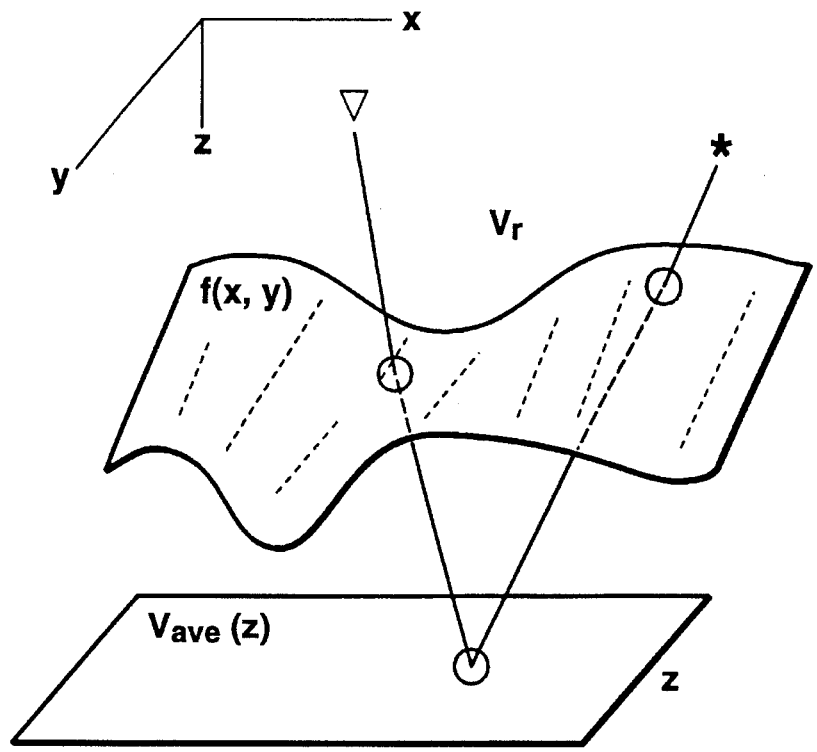
FIG. 3 focuses on the step of the calculation using the replacement seismic velocity in lieu of the seismic velocity of water.
Figure 4:
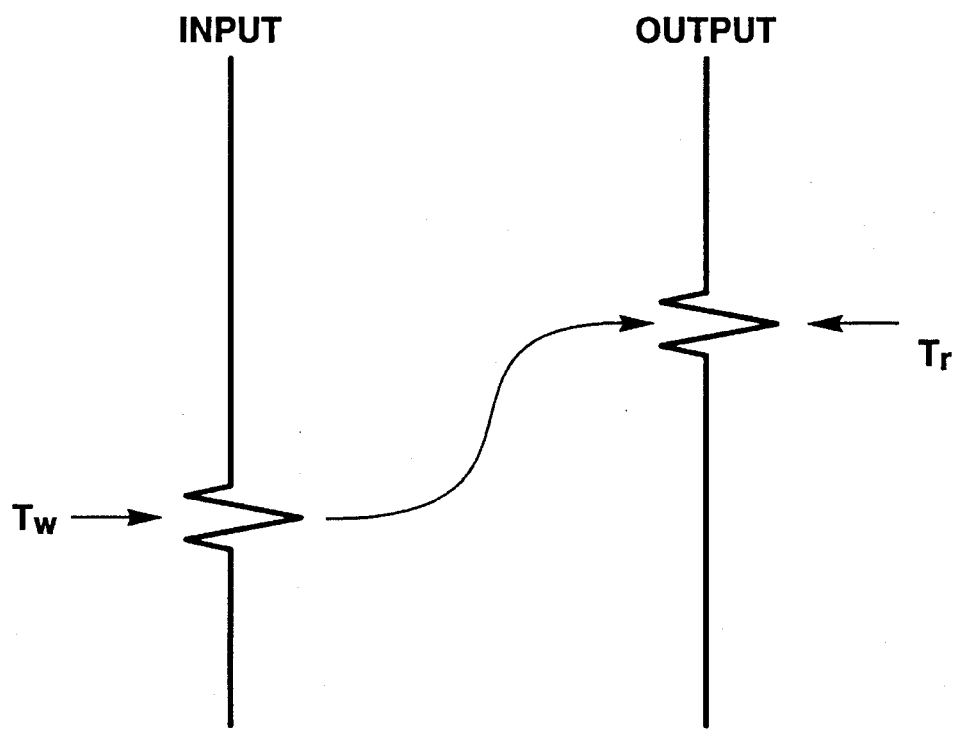
FIG. 4 depicts the shifting of the seismic signal from the input trace to the output trace.

These Equations (18) through (23) are the basic equations used to perform replacement dynamics. For a given $z_h$, FIGS. 2, 3, and 4 illustrate the procedure. These equations are solved using an appropriate initial guess to ensure convergence, as discussed herein. Then once the six unknowns are determined, traveltime $T_w$ is computed with seismic velocity $V_w$ in the water layer. This time models a reflection from depth $z_h$ on the recorded seismic trace. The calculation is performed again, but with replacement seismic velocity, $V_r$, in the water layer to compute traveltime $T_r$. Time $T_r$ is the time that the previously modeled reflection event would have appeared at on the trace if the water layer had actually had the replacement seismic velocity $V_r$. So the sample on the recorded trace at time $T_w$ is moved to the output or "replaced" trace at time $T_r$. Since the procedure needs to be able to construct every sample on the replaced trace by this kinematic mapping, the traveltime calculation procedure is performed over a range of $z_h$ depths, giving $T_w=T_w(z_h)$ and $T_r=T_r(z_h)$. Then, to construct the replaced trace, interpolation is used to resample $T_r$ and $T_w$ finely in $z_h$, so that essentially $T_w$ is known for each sampled $T_r$ value on the replaced trace. The amplitude on the replaced trace at some particular time $t_r=T_r(z_h)$ is then simply the amplitude which exists on the recorded trace at the corresponding $t_w=T_w(z_h)$ time. Once these two functions are known, the entire recorded trace is mapped onto the replaced trace and the replacement dynamics procedure then outputs that trace and processes the next recorded trace. Thus, for each recorded trace, each of a plurality of signals is mapped onto a corresponding replaced trace. Initial guesses are trace by trace independent. The procedure repeats until all desired traces have been processed or "replaced."

The fixed-point iteration method requires an appropriate initial guess to ensure convergence. There would be several ways to arrive at an appropriate initial guess, as would be apparent to one of ordinary skill in the art. In the preferred mode, for the smallest $z_h$ value, i.e., for a location just under the water bottom, the first initial guess x, y coordinates are determined to fall along a line connecting $x_s$, $y_s$ to $x_r$, $y_r$. The initial values for $x_{ws}$, $y_{ws}$ are arbitrarily selected to be one-eighth of the distance from $x_s$, $y_s$ to $x_r$, $y_r$; similarly, the initial values for $x_{wr}$, $y_{wr}$ are arbitrarily selected to be one-eighth of the distance from $x_r$, $y_r$ to $x_s$, $y_s$. The initial values for $x_h$, $y_h$ are selected to be at the midpoint of that line, or $x_m$, $y_m$. Note these initial guesses are appropriate where the top layer of the formation has a lower seismic velocity than does the bottom layer, which is the typical case. In the alternative case of the top layer having a higher seismic velocity than does the bottom layer, bottom layer, the initial guesses for $x_{wr}$, $y_{wr}$ and $x_{ws}$, $Y_{ws}$ would be the x, y coordinates corresponding to three-eighths of the way along the line from receiver to source and source to receiver respectively. Then, as $z_h$ is increased (advancing deeper into the subsurface), for each successive calculation the previous solution is used as the initial guess for each of the six variables. This leads to swift convergence, in usually one or two iterations per $z_h$, depending upon the tolerance for error, for each of the successive calculations. Thus, the numerical scheme is computationally efficient. As is demonstrated in the Example, the algorithm is also very accurate.

As would be apparent to one of ordinary skill in the art, there are limitations of the method disclosed within. Four of the six Fermat's principle equations, Equations (12) through (15), depend upon derivatives of the water,bottom surface, f(x, y). If (x, y) has a lot of small-wavelength variability, that is, small-scale features, then there may be many true solutions of the equations—that is, there is multivaluedness. Each solution will correspond to a different branch or piece of a multivalued wavefront. Because the method operates independently on each trace, inconsistent solutions are therefore possible with such bathymetry. The result is local incoherencies in the processed output.

In the preferred embodiment of the within invention, the function f(x, y) modeling the water bottom is smoothed to reduce all the small scale features. This smoothing can be accomplished by any of a number of methods known to those skilled in the art, such as taking a running average or using convolutional filters. This step significantly reduces multivaluedness and makes the solution consistent. The medium-long wavelength nonhyperbolic moveout components are then reduced from the data, using techniques known to those of ordinary skill in the art. Also, the nonlinearity of the problem is nonlinearly proportional to function f(x, y); hence, general stability and convergence are improved by removing all unnecessary nonlinearity from f(x, y) by such smoothing.

A further limitation can be found in the use of $V_{ave}(z_h)$. The method approximates the sediment velocities with $V_{ave}(z_h)$, and therefore is not suitable in areas where this might be a poor approximation, such as where significant lateral seismic velocity variations exist in the sediment layers. That is, the higher the lateral seismic velocity variation, the less theoretically accurate this method. However, this approximation is consistent with the type of time-processing algorithms that the method is attempting to prepare the data for, which also do not assume the existence of lateral seismic velocity variations. The difference of the traveltimes $T_w$ and $T_r$ for each signal on a trace form the corrections that are applied to the trace, as shown in FIG. 4; thus, absolute errors in the seismic velocity field tend to cancel out, and the actual variability of the water bottom contributes foremost to the corrections that are applied to each trace. Thus, precision in the sediment seismic velocity function is less important than is precision in the water bottom surface function, f(x, y).

EXAMPLE

Figure 5:
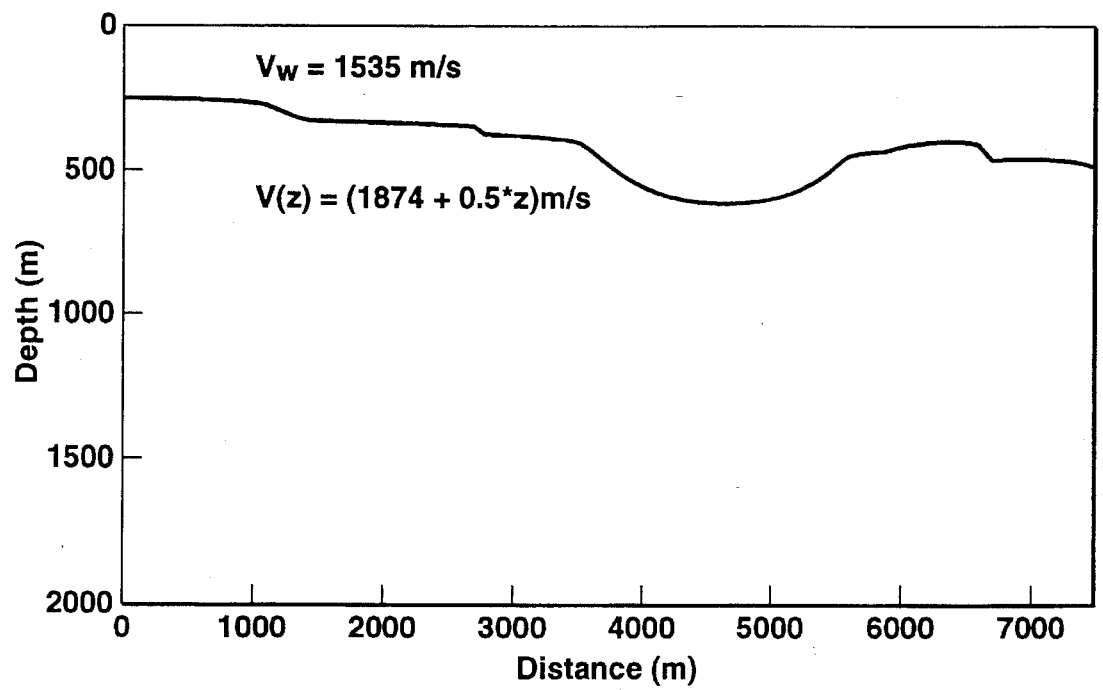
FIG. 5 plots the function describing the sea floor in the Example, and shows the velocity values used in the Example.

FIG. 5 shows an actual water-bottom profile extracted from seismic data acquired in the Gippsland Basin. Notice the channel feature in the water bottom at approximately distance 3500–5500 m. The appropriate seismic velocity for water used was 1535 m/s, while the approximate seismic velocity function of the sediment used was $$V(z) = (1874 + 0.5z) m/s. \quad (24)$$

A highly accurate, but costly, numerical ray tracing calculation was performed to model a reflection from the bottom of the model, at 2000 m. Then the method of the within invention was used to model the same event The source was placed at depth 0 m and at distance 7500 m and receivers were placed at depth 0 m and uniformly over the distance range 0 to 7500 m at 50 m increments on FIG. 5. Then a reflection event from a reflector at 2000 m depth, which is the base of the model, was made using both numerical ray tracing and the replacement dynamics equations (Equations 18 through 23), using the seismic velocity of water (1535 m/s).

In order to establish, first, the efficiency and accuracy of the replacement dynamics equations as compared to the more expensive numerical ray tracing method, both methods were performed using the seismic velocity of water for the water layer. See discussion of FIG. 6. Second, the fact that using a replacement seismic velocity reduces nonhyperbolic distortion with either of the two methods is established. See discussion of FIG. 7. Finally, it is established that the amount of nonhyperbolic distortion reduced with the replacement dynamics equations in combination with the replacement seismic velocity is essentially the same as that reduced with the more expensive, precise numerical ray tracing method with the replacement seismic velocity. See discussion of FIG. 8.

Figure 6:
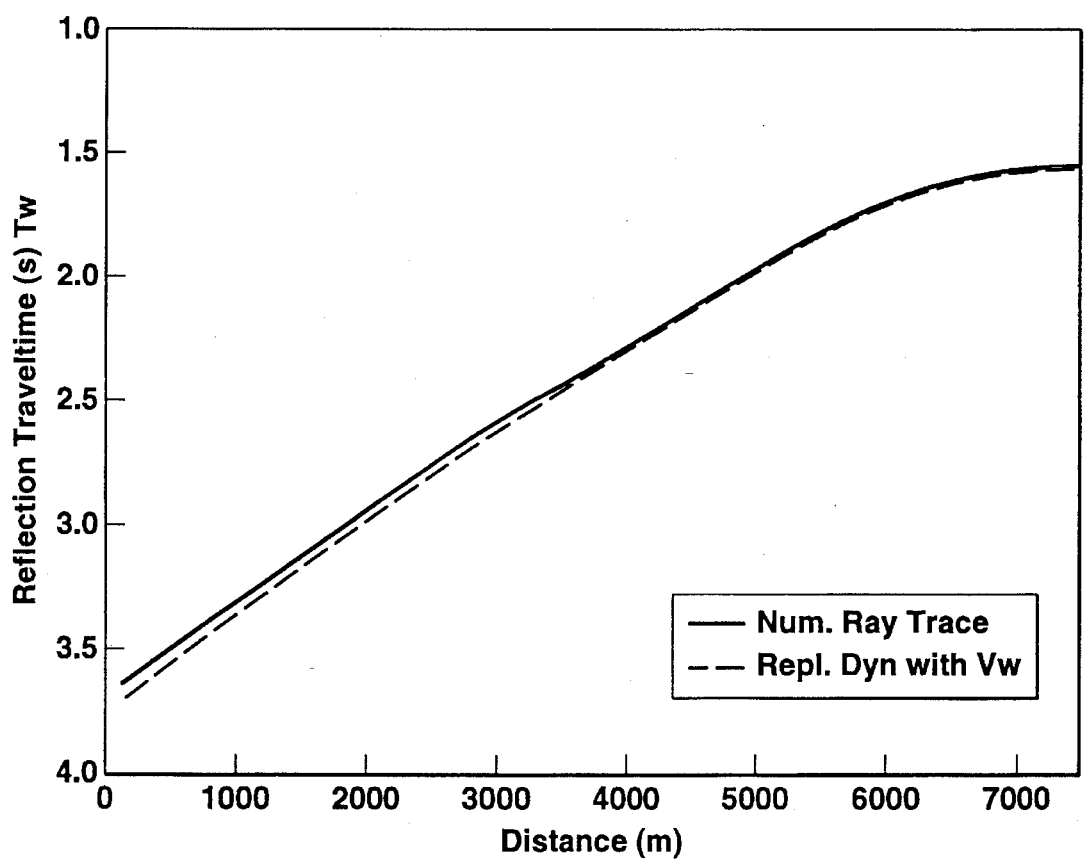
FIG. 6 plots the reflection traveltime from a depth of 2000 m. against the horizontal distance for both numerical ray tracing (more expensive but precise) and use of the replacement dynamics equations with the seismic velocity of water in the Example.

FIG. 6 shows the two modeled reflection events, with the solid line representing the precise but costly numerical ray tracing results and the dashed line representing the replacement dynamics equations, both methods using the seismic velocity of water. FIG. 6 therefore confirms that use of the replacement dynamics equations by themselves gives a very close approximation to the costly but precise numerical ray tracing. The nonhyperbolic distortion in the events at approximately 3500 to 5000 m (observable as a depression between those distances on FIG. 8 as discussed later) is exactly what seismic time-processing algorithms have difficulty with. The curves are very similar, except that the replacement dynamics result shows slight, but systematic, delay as offset increases. This is the result of the Dix-type seismic velocity approximation discussed earlier.

Figure 7:
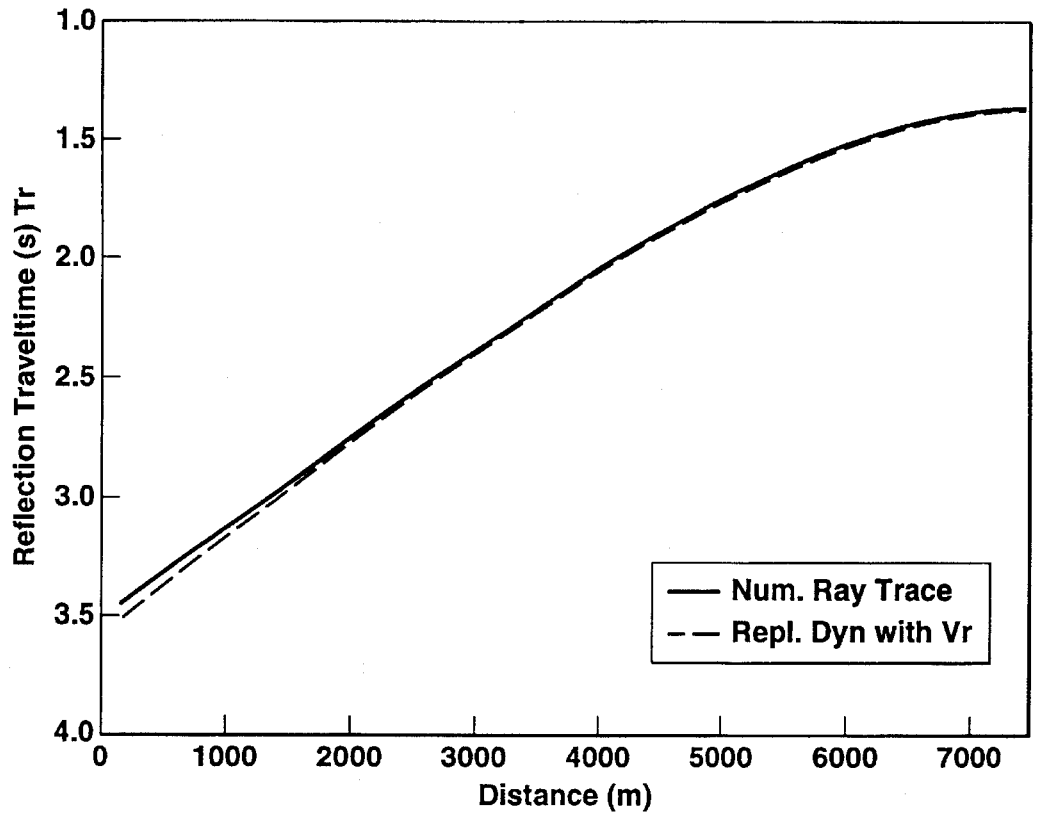
FIG. 7 plots the reflection traveltime from a depth of 2000 m. against the horizontal distance for both numerical ray tracing (more expensive but precise) and the method of the within invention, using the replacement dynamics equations for the within invention and the replacement seismic velocity in lieu of the seismic velocity of water for both methods, in the Example. Note that the only difference between FIGS. 6 and 7 is the seismic velocity used in the water layer.

To demonstrate the ability of the replacement dynamics equations, coupled with seismic velocity replacement, to reduce the nonhyperbolic distortion, the calculations were repeated with a replacement seismic velocity of 2100 m/s in the water layer. The corresponding reflection events are shown in FIG. 7. The nonhyperbolic distortion is now gone, and both curves have been shifted up because the seismic velocity in the top layer was increased from 1535 to 2100 m/s. The use of the replacement seismic velocity function instead of the seismic velocity of water would convert the reflection in FIG. 6 into the one seen in FIG. 7, which figure has hyperbolic form, so it is appropriate for time-processing methods.

Figure 8:
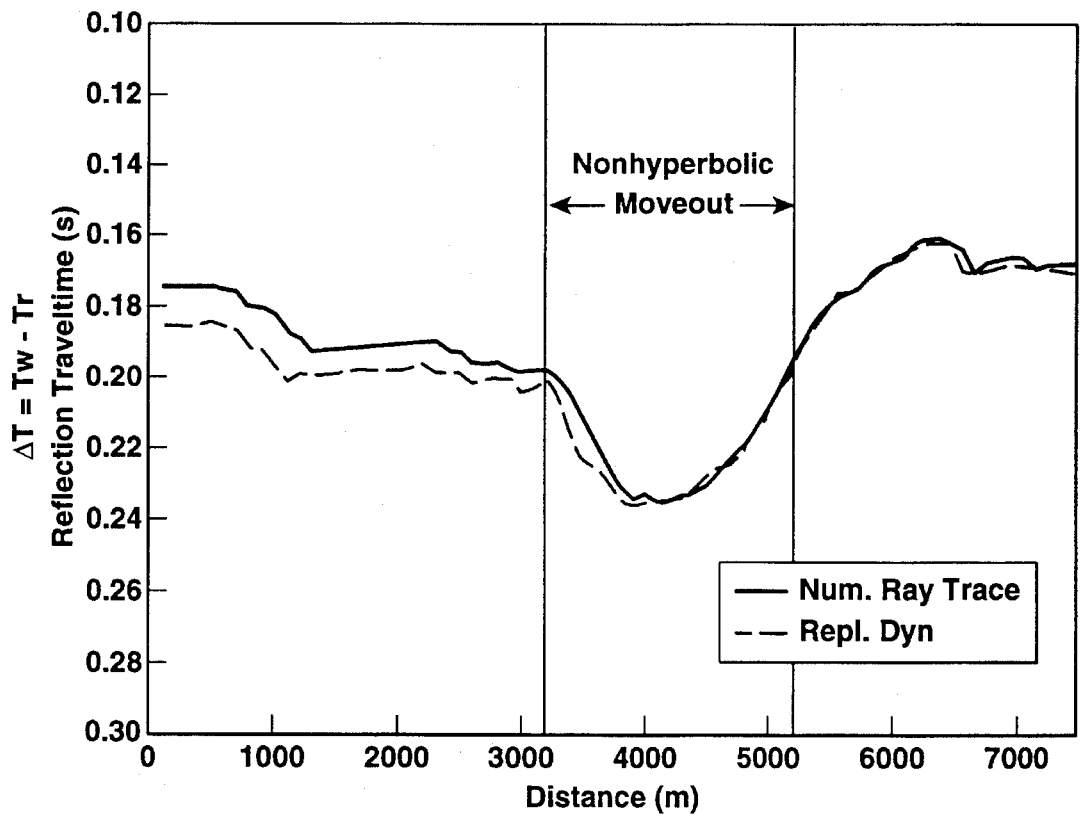
FIG. 8 plots the difference as a function of distance between the two sets of curves in FIGS. 6 and 7, comparing the time corrections as computed with numerical ray tracing with the replacement dynamics equations of the within invention.

The shifts in traveltime as a function of offset, which shifts were applied to the traces in converting FIG. 6 into FIG. 7, correspond to the differences of the two sets of curves. FIG. 8 shows these difference curves, wherein the difference for numerical ray tracing is again shown as a solid line, and the difference using the replacement dynamics equations is again shown as a dashed line. These difference curves basically set how much the input signal would be shifted to produce the output signal. See FIG. 4. Notice that the curves in FIG. 8 indicate a bulk shift of about 0.18 s, and nonhyperbolic distortion, a "hump" of up to 0.070 s (corresponding to roughly 3500 to 5000 m) that was reduced. Importantly, the two "correction" curves, one for numerical ray tracing and one for replacement dynamics, shown here are basically parallel, indicating that the efficient replacement dynamics performed almost as well as the more expensive, highly precise numerical ray tracing. One can see that the zero-offset traveltimes are altered by replacement dynamics (see FIGS. 6 and 7), that is, shifted, in time according to FIG. 4, so after the optimal stack is made, replacement dynamics is run in reverse by interchanging the roles of $V_w$ and $V_r$. This will restore the original zero-offset times to the stacked data, and correct final positioning may be obtained with poststack depth migration. This is a more efficient processing stream than one using prestack depth migration.

Persons skilled in the art will understand that the method for curved ray replacement dynamics described herein may be practiced with any type of numerical technique to solve for the six unknowns, and any $V_{ave}(z_h)$ which reasonably approximates the subsurface seismic velocity, and any replacement seismic velocity which reduces the seismic velocity contrast at the water bottom, with improved results as the seismic velocity contrast decreases.

It can be further appreciated that curved-ray replacement dynamics is a good compromise between expensive, more accurate numerical ray tracing schemes and cheap, inaccurate statics approaches. Its use of analytic ray tracing allows for efficiency and accuracy, even in 3D. It is applicable to seismic marine 2D or 3D data, as long as the bathymetry map is known fairly accurately and the data are appropriate for time processing, such as normal move out (NMO), dip move out (DMO), stack and poststack migration. These components are used to process most 3D marine seismic data today. In certain basins, where water-bottom irregularity is moderate to severe, seismic velocity replacement is an important processing step, and the curved-ray replacement dynamics approach has thus far proven itself efficient and accurate. There are few, if any, other acceptable techniques for 3D data. It should be used before time processing. After the optimal stack is obtained, replacement dynamics is run in reverse, to reduce the approximate corrections, and, finally, accurate depth imaging is performed with poststack depth migration. This is an optimal processing stream, in terms of efficiency and accuracy, for 3D marine data acquired over a significantly irregular water bottom. As discussed above, the data processor must ensure that the water-bottom surface is smooth, with no unnecessary small-scale variations. This will ensure consistency and stability of the replacement dynamics solution.

One of ordinary skill in the art would further appreciate that the method herein may be easily formulated to model reflections from 3D dipping "planar" reflectors by modifying the equations. Additionally, the sedimentary seismic velocity function may be modified so that it varies smoothly in the lateral direction, within the limits of the Dix-type approximation. Additionally, applications for land data near-surface seismic velocity replacement are possible, by treating the near-surface, low seismic velocity layer (LVL) the same as the water layer in the within invention. In such a version, the seismic velocity would be allowed to vary within the LVL also.

Further, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A computer-implemented method for processing a seismic data trace to reduce nonhyperbolic distortion caused by a contrast between the seismic velocities of adjacent upper and lower layers of the earth having an irregular boundary, said seismic data trace comprising a time series of discrete data samples of the amplitude of seismic energy received by a receiver in response to a seismic signal from a source, said method comprising the steps of:

(a) determining the seismic velocity in said upper layer and a subsurface seismic velocity function for said lower layer;

(b) determining a replacement seismic velocity for said upper layer which reduces said seismic velocity contrast;

(c) selecting a plurality of reflector locations at various depths within said lower layer and for each of said reflector locations, (1) determining, according to Fermat's principle and Snell's law, a raypath from said source downwardly through said irregular boundary to a reflection point at said reflector location and then upwardly through said irregular boundary to said receiver, (2) determining a first seismic traveltime along said raypath using said seismic velocity in said upper layer for portions of said raypath in said upper layer and said subsurface seismic velocity function for portions of said raypath in said lower layer, (3) determining a second seismic traveltime along said raypath using said replacement seismic velocity for portions of said raypath in said upper layer and said subsurface seismic velocity function for portions of said raypath in said lower layer, and (4) determining a traveltime difference between said first and second seismic traveltimes;

(d) using said traveltime difference for each of said plurality of reflector locations and the process of interpolation to determine a traveltime correction for each data sample on said seismic data trace; and (e) shifting each data sample on said seismic data trace by an amount equal to said traveltime correction for said data sample to create a replacement data trace having reduced nonhyperbolic distortion.

2. The method of claim 1, further comprising the step of determining, for each of said raypaths, an average seismic velocity for portions of said raypath in said lower layer, and wherein said first and second seismic traveltimes are determined using said average seismic velocity instead of said subsurface seismic velocity function for portions of said raypath in said lower layer.

3. The method of claim 2, wherein said raypath for each of said reflector locations is determined using a set of six equations with six unknowns, which equations are based on Fermat's principle, said six unknowns being the horizontal (x,y) coordinates of (A) the point where the downgoing portion of said raypath intersects said irregular boundary, (B) the reflection point, and (C) the point where the upgoing portion of said raypath intersects said irregular boundary.

4. The method of claim 3, wherein said set of six equations are solved using Newton's method in multidimensions.

5. The method of claim 3, wherein said set of six equations are solved using fixed-point iteration in multidimensions.

6. The method of claim 1, wherein said irregular boundary can be described by a mathematical function, said method further comprising the step of smoothing said mathematical function to reduce multivaluedness prior to the step of determining said raypath from said source to said receiver for each of said vertically spaced-apart locations.

7. The method of claim 1, wherein said upper layer is essentially water.

8. The method of claim 1, wherein said upper layer comprises a seismic low-velocity-layer.

9. A computer-implemented method for processing a set of common midpoint seismic data traces to reduce nonhyperbolic distortion caused by a contrast between the seismic velocities of adjacent upper and lower layers of the earth having an irregular boundary, each of said seismic data traces comprising a time series of discrete data samples of the amplitude of seismic energy received by a receiver in response to a seismic signal from a source, said method comprising the steps of:

(a) determining the seismic velocity in said upper layer and a subsurface seismic velocity function for said lower layer;

(b) determining a replacement seismic velocity for said upper layer which reduces said seismic velocity contrast;

(c) determining source and receiver positions for a selected seismic data trace;

(d) selecting a plurality of reflector locations at various depths within said lower layer and for each of said reflector locations, (1) determining, according to Fermat's principle and Snell's law, a raypath from said source downwardly through said irregular boundary to a reflection point at said reflector location and then upwardly through said irregular boundary to said receiver, (2) determining a first seismic traveltime along said raypath using said seismic velocity in said upper layer for portions of said raypath in said upper layer and said subsurface seismic velocity function for portions of said raypath in said lower layer, (3) determining a second seismic traveltime along said raypath using said replacement seismic velocity for portions of said raypath in said upper layer and said subsurface seismic velocity function for portions of said raypath in said lower layer, and (4) determining a traveltime difference between said first and second seismic traveltimes;

(e) using said traveltime difference for each of said plurality of reflector locations and the process of interpolation to determine a traveltime correction for each data sample on said selected seismic data trace;

(f) shifting each data sample on said selected seismic data trace by an amount equal to said traveltime correction for said data sample to create a replacement data trace having reduced nonhyperbolic distortion;

(g) repeating steps (c) through (f) for each of said common midpoint seismic data traces to create a set of common midpoint replacement data traces;

(h) stacking said common midpoint replacement data traces to create a zero-offset replacement data trace; and (i) repeating steps (c) through (f) for said zero-offset replacement data trace, but shifting said data samples in the opposite direction, to create a stacked zero-offset data trace having the same time frame as the unprocessed seismic data traces.

10. The method of claim 9, further comprising the step of determining, for each of said raypaths, an average seismic velocity for portions of said raypath in said lower layer, and wherein said first and second seismic traveltimes are determined using said average seismic velocity instead of said subsurface seismic velocity function for portions of said raypath in said lower layer.

11. The method of claim 9, wherein said raypath for each of said reflector locations is determined using a set of six equations with six unknowns, which equations are based on Fermat's principle, said six unknowns being the horizontal (x,y) coordinates of (A) the point where the downgoing portion of said raypath intersects said irregular boundary, (B) the reflection point, and (C) the point where the upgoing portion of said raypath intersects said irregular boundary.

12. The method of claim 11, wherein said set of six equations are solved using Newton's method in multidimensions.

13. The method of claim 11, wherein said set of six equations are solved using fixed-point iteration in multidimensions.

14. The method of claim 9, wherein said irregular boundary can be described by a mathematical function, said method further comprising the step of smoothing said mathematical function to reduce multivaluedness prior to the step of determining said raypath from said source to said receiver for each of said vertically spaced apart locations.

15. The method of claim 9, wherein said upper layer is essentially water.

16. The method of claim 9, wherein said upper layer comprises a seismic low-velocity-layer.

* * * * *